(12) United States Patent
Lee

(10) Patent No.: US 8,500,339 B2
(45) Date of Patent: Aug. 6, 2013

(54) LOCKING DEVICE AND METHOD FOR USE WITH A MULTI-FIBER PUSH ON (MPO) CONNECTOR MODULE TO PREVENT THE MPO CONNECTOR MODULE FROM BEING DECOUPLED FROM A RECEPTACLE

(75) Inventor: Chi K. Lee, Palo Alto, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 284 days.

(21) Appl. No.: 13/004,874

(22) Filed: Jan. 11, 2011

(65) Prior Publication Data

US 2012/0177335 A1    Jul. 12, 2012

(51) Int. Cl.
*G02B 6/36* (2006.01)

(52) U.S. Cl.
USPC .............................................. 385/53; 385/88

(58) Field of Classification Search
None
See application file for complete search history.

(56) References Cited

U.S. PATENT DOCUMENTS

| 4,547,039 A | 10/1985 | Caron et al. |
| 4,712,860 A | 12/1987 | Corrales |
| 4,737,008 A | 4/1988 | Ohyama et al. |
| 5,082,346 A | 1/1992 | Myers |
| 6,511,233 B1 * | 1/2003 | Steijer et al. .................... 385/88 |
| 6,718,112 B1 | 4/2004 | Rodriguez et al. |
| 2002/0041738 A1 | 4/2002 | Carberry et al. |
| 2007/0258683 A1 | 11/2007 | Rolston et al. |
| 2009/0148104 A1 | 6/2009 | Lu et al. |

FOREIGN PATENT DOCUMENTS

| WO | WO-2007/053660 | 5/2007 |
| WO | WO-2007/128118 | 11/2007 |

* cited by examiner

*Primary Examiner* — Sarah Hahm

(57) ABSTRACT

A locking device is provided that is configured to be attached to the MPO connector module and placed in a locking state that prevents the MPO connector module from being decoupled from the receptacle. The locking device may be a locking clip that is configured to be inserted into a keying slot formed in an MPO connector module. When the locking clip is inserted into the keying slot and placed in a locking state, the locking clip prevents the MPO connector module from being decoupled from the receptacle. If the locking clip is placed in an unlocking state, a tool or fingers can be used to extract the locking clip from the keying slot, thereby making it possible to decouple the MPO connector module from the receptacle.

10 Claims, 4 Drawing Sheets

LOCKING DEVICE AND METHOD FOR USE WITH A MULTI-FIBER PUSH ON (MPO) CONNECTOR MODULE TO PREVENT THE MPO CONNECTOR MODULE FROM BEING DECOUPLED FROM A RECEPTACLE

TECHNICAL FIELD OF THE INVENTION

The invention relates to optical communications. More particularly, the invention relates to a locking device and method for use with a multi-fiber push on (MPO) connector module to prevent the MPO connector module from being decoupled from the receptacle.

BACKGROUND OF THE INVENTION

FIG. 1 illustrates a perspective view of a known multi-fiber push on (MPO) connector module 2 designed for use with a parallel optical transceiver module. The MPO connector module 2 is secured to a duplex fiber ribbon cable 3 having a total of four, eight, twelve or twenty-four optical fibers (not shown). A strain relief device 4 holds and grips the fibers below their ends to prevent the fiber ends from moving in the event that mechanical loading on the cable 3 occurs due to tugging or pulling of the cable 3. The connector module 2 has an outer housing 5 and an inner housing 6. The inner housing 6 has latching elements 7 thereon for securing the module 2 to the receptacle 21. A collar 8 surrounds the outer housing 5 of the connector module 2 and is in sliding engagement therewith. The ends of the optical fibers (not shown) are held within a multi-fiber ferrule 9 that extends slightly beyond the end 11 of the inner housing 6. The ends (not shown) of the fibers are polished and extend a very small distance beyond the end of the ferrule 9 such that the polished end of each fiber provides a flat optical element for coupling light between the polished end and an optical element (not shown) of the receptacle 21.

The collar 8 is in sliding engagement with the outer housing 5 of the connector module 2. When a user inserts the MPO connector module 2 into the receptacle 21, the user pushes the collar 8 towards the receptacle 21 such that the inner surface of the collar 8 presses against latching elements (not shown) of the receptacle 21 to prevent them from disengaging from the latching elements 7. In order to decouple the MPO connector module 2 from the receptacle 21, a user pulls the collar 8 in a direction opposite the direction of insertion of the module 2 into the receptacle 21. When the collar 8 is moved in this direction, the force exerted by the inner surface of the collar 8 on the latching elements of the receptacle 21 is removed to allow the module 2 to be decoupled from the receptacle 21.

While the MPO connector 2 works well for its intended purpose, it is designed to be easily manually decoupled from the receptacle 21 by a user by hand. In certain cases, it is desirable to prevent an MPO connector module of the type shown in FIG. 1 from being easily manually decoupled from a receptacle, such as in cases where the connection between the MPO connector module and the receptacle is intended to be a permanent or pseudo-permanent connection.

Accordingly, a need exists for a device that is adapted to be used with an MPO connector module to prevent the module from being easily manually decoupled from a receptacle.

SUMMARY OF THE INVENTION

The invention provides a locking device for use with an MPO connector module for preventing the MPO connector module from being decoupled from a receptacle. The locking device comprises a clip configured to be secured to the MPO connector module in such a way that the clip prevents the MPO connector module from being decoupled from the receptacle.

The method comprises providing a clip configured to be attached to an MPO connector module, and attaching the clip to the MPO connector module in such a way that the clip prevents the MPO connector module from being decoupled from the receptacle.

These and other features and advantages of the invention will become apparent from the following description, drawings and claims.

DETAILED DESCRIPTION OF AN ILLUSTRATIVE EMBODIMENT

In accordance with the invention, a locking device is provided that is configured to be attached to the MPO connector module and placed in a locking state that prevents the MPO connector module from being decoupled from the receptacle. In accordance with an illustrative, or exemplary, embodiment, the locking device is a locking clip that is configured to be inserted into a keying slot formed in an MPO connector module. When the locking clip is inserted into the keying slot and placed in a locking state, the locking clip prevents the MPO connector module from being decoupled from the receptacle. As long as the locking clip remains in the keying slot, the MPO connector module cannot be decoupled from the receptacle. If the locking clip is placed in an unlocking state, a tool or fingers can be used to extract the locking clip from the keying slot, thereby making it possible to decouple the MPO connector module from the receptacle. An illustrative, or exemplary, embodiment of the invention will now be described with reference to FIGS. 2A-5B.

Figure 2A:
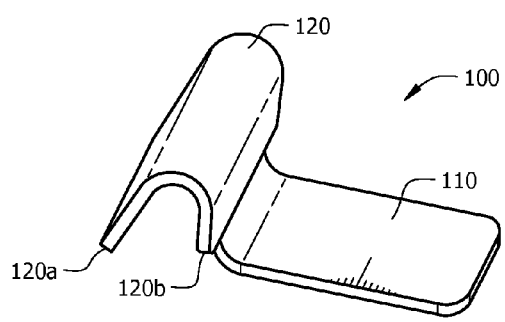
FIGS. 2A and 2B illustrate top and bottom perspective, views, respectively, of an illustrative, or exemplary, embodiment of a locking clip in accordance with the invention.
Figure 2B:
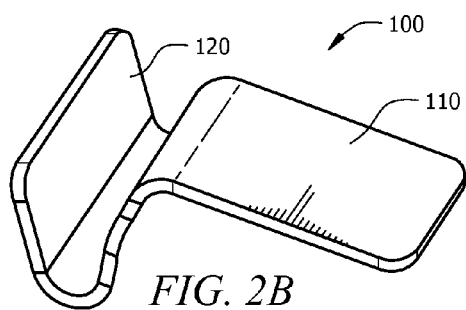

FIGS. 2A and 2B illustrate top and bottom perspective views, respectively, of the locking device 100. In accordance with this embodiment, the locking device 100 is a spring clip having a tongue portion 110 and a generally U-shaped portion 120. The locking clip 100 is made of a flexible material, such as sheet metal, for example. The tongue portion 110 is configured to be inserted into a keying slot (not shown) formed in an MPO connector module, as will be described below in detail with reference to FIGS. 3-5B. The generally U-shaped portion 120 of the spring clip 100 is configured to flex inwardly in order to place the spring clip 100 in the locking state and to flex outwardly in order to place the spring clip 100 in the unlocking state, as will be described below in detail with reference to FIGS. 5A and 5B.

Figure 1:
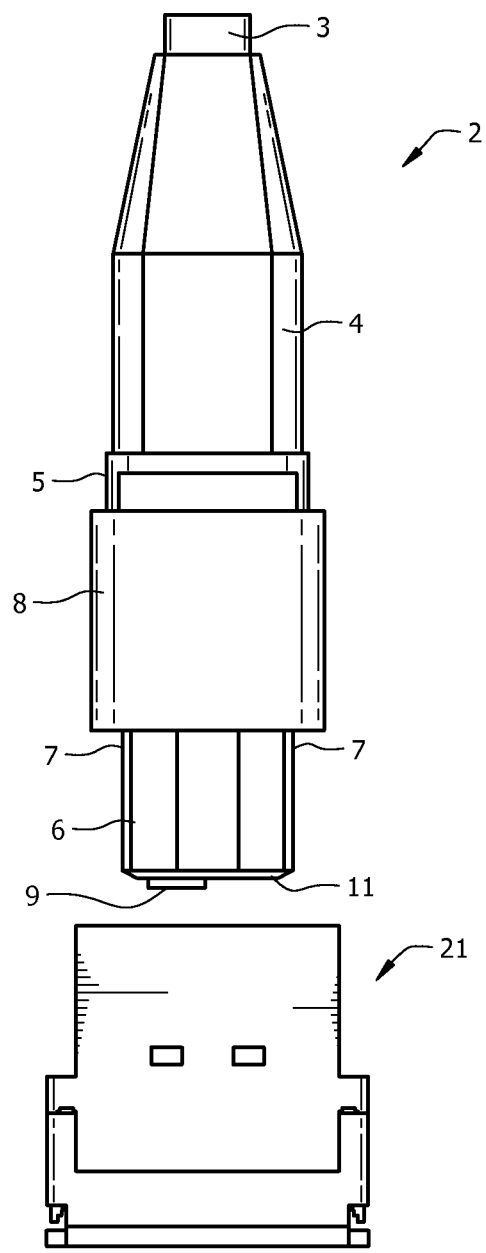
FIG. 1 illustrates a three dimensional (3-D) top view of a known MPO connector module designed for use with a parallel optical transceiver module.
Figure 3:
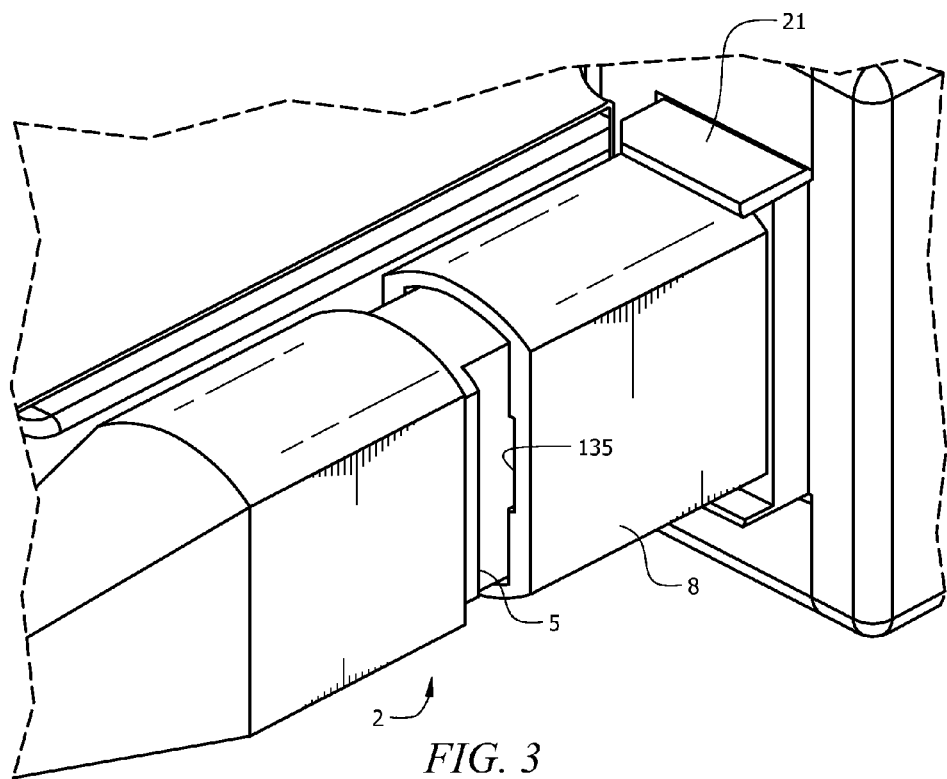
FIG. 3 illustrates a side perspective view of the MPO connector module shown in FIG. 1 mated with the receptacle shown in FIG. 1.
Figure 4:
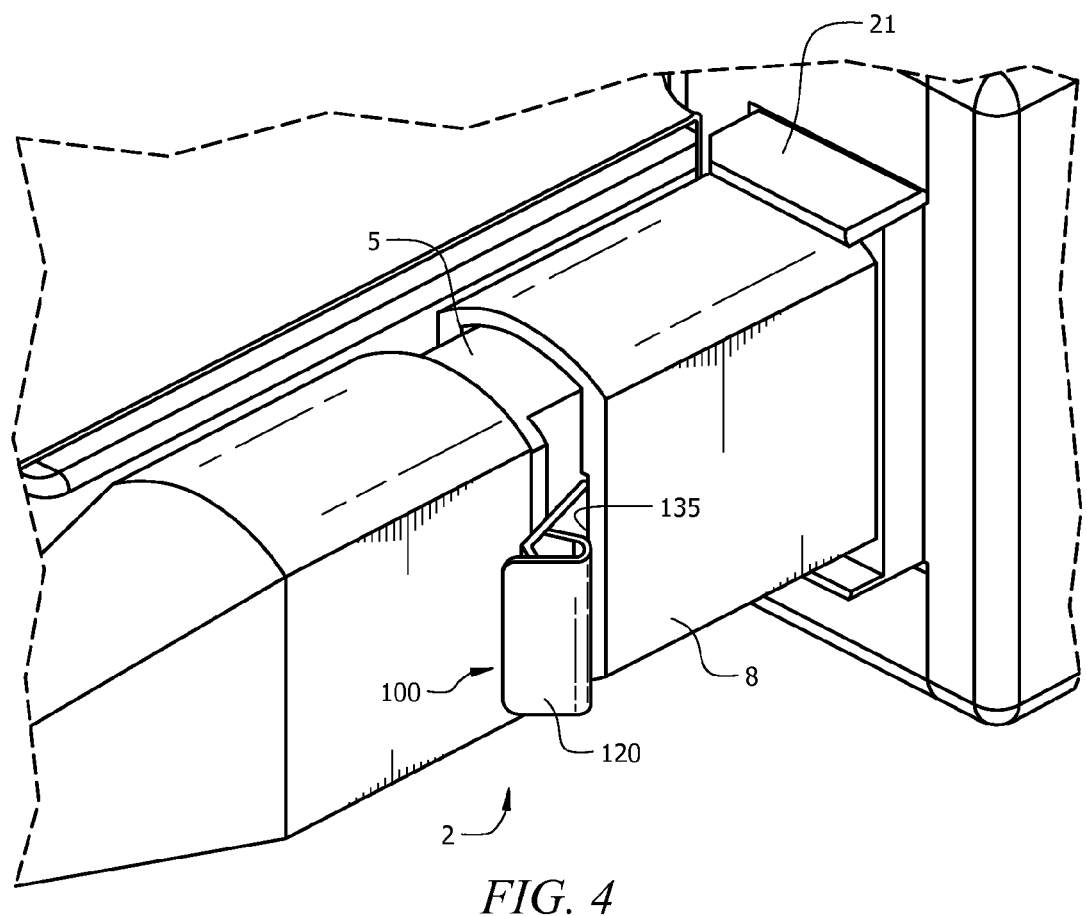
FIG. 4 illustrates a side perspective view of the mated MPO connector module and receptacle shown in FIG. 3 with the locking clip shown in FIGS. 2A and 2B inserted into a keying slot of the MPO connector module.
Figure 5A:
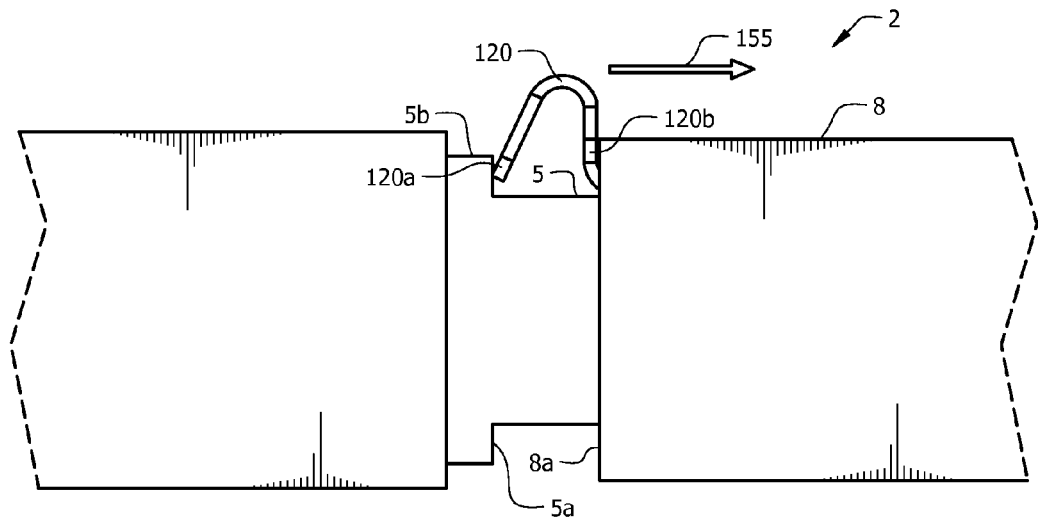
FIG. 5A illustrates a side plan view of the mated MPO connector module and receptacle shown in FIG. 3 with the locking clip shown in FIGS. 2A and 2B inserted into a keying slot of the MPO connector module and placed in a biased state.
Figure 5B:
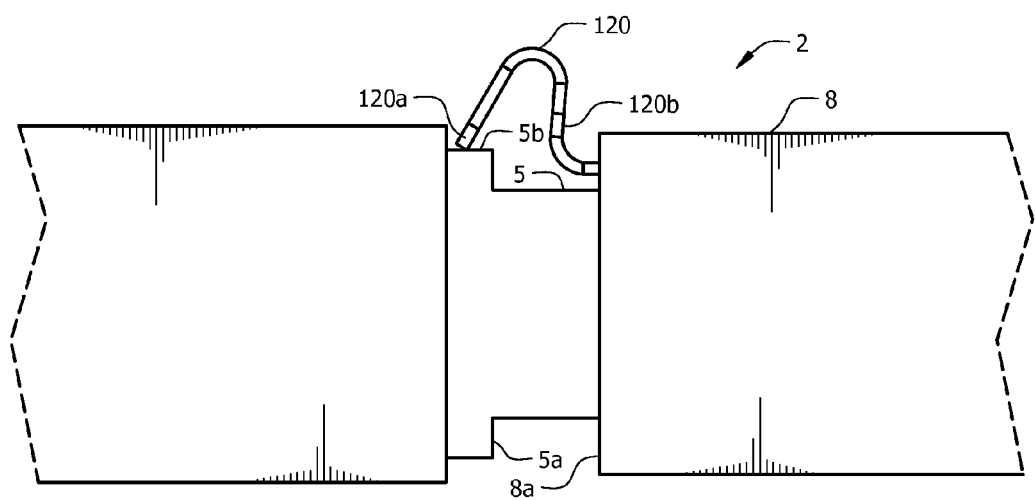
FIG. 5B illustrates a side plan view of the mated MPO connector module and receptacle shown in FIG. 3 with the locking clip shown in FIGS. 2A and 2B inserted into a keying slot of the MPO connector module and placed in an unbiased biased state.

FIG. 3 illustrates a side perspective view of the MPO connector module 2 shown in FIG. 1 coupled with the receptacle 21 shown in FIG. 1. FIG. 4 illustrates a side perspective view of the MPO connector module 2 coupled with the receptacle 21, as shown in FIG. 3, but having the spring clip 100 (FIGS. 2A and 2B) inserted therein. FIGS. 5A and 5B illustrate side plan views of the MPO connector module 2 and receptacle 21 shown in FIG. 4 with the spring clip 100 secured to the module 2 in the locking and unlocking states, respectively. The manner in which the spring clip 100 may be used to lock the MPO connector module 2 to the receptacle 21 and to unlock the MPO connector module 2 from the receptacle 21 will now be described with reference to FIGS. 1-5B.

A keying slot 135 (FIG. 3) exists in the MPO connector module 2 (FIG. 1) for orienting the collar 8 (FIG. 1) with the outer housing 5 (FIG. 1) of the MPO connector module 2. In FIG. 4, the spring clip 100 is shown with the U-shaped portion 120 unflexed such that the spring clip 100 is in its unlocking state. The tongue portion 110 is inserted into the keying slot 135 by a user who uses his or her fingers or a tool, such as a pair of tweezers, for example, to insert the tongue portion 110 into the keying slot 135. Once the tongue portion 110 has been inserted into the keying slot 135, as shown in FIG. 4, the tongue portion 110 is secured to the MPO connector module 2 by opposing retention forces exerted on the tongue portion 110 by the outer housing 5 of the MPO connector module 2 and by the inner surface of the collar 8 of the MPO connector module 2. Therefore, even when the U-shaped portion 120 is in the unlocking state shown in FIG. 4, the opposing retention forces exerted on the tongue portion 110 by the outer housing 5 and the inner surface of the collar 8 maintain the spring clip 100 within the keying slot 135. Thus, the spring clip 100 will be retained within the keying slot 135 until a user exerts a force on the spring clip 100 sufficient to overcome the retention forces and extract the spring clip 100 from the keying slot 135.

When the spring clip 100 is in the locking state shown in FIG. 5A, an end 120a of the U-shaped portion 120 is in abutment with a forward surface 5a of the outer housing 5 of the MPO connector module 2. In this state, the opposite ends 120a and 120b of the U-shaped portion 120 are flexed toward each other such that a spring force is exerted by the end 120a of the U-shaped portion 120 on the forward surface 5a of the outer housing 5, and vice versa. The spring force exerted by the end 120a of the U-shaped portion 120 on the forward surface 5a of the outer housing 5 biases the tongue portion 110 forward in the direction indicated by arrow 155 such that the end 120b of the U-shaped portion 120 exerts a force on an end 8a of the collar 8 that, in turn, causes the collar 8 to be biased in the direction indicated by arrow 155. This biasing of the collar 8 in the direction indicated by arrow 155 ensures that the latching elements 7 of the MPO connector module 2 remain engaged with the latching elements (not shown) of the receptacle 21. Thus, when the spring clip 100 is placed in the locking state, the MPO connector module 2 cannot be decoupled from the receptacle 21, i.e., the MPO connector module 2 is locked to the receptacle 21.

When the spring clip 100 is in the unlocking state shown in FIG. 5B, the generally U-shaped portion 120 is unflexed such that the end 120a of the U-shaped portion 120 rests on the outer surface 5b of the outer housing 5. In this unflexed state, the end 120b of the tongue portion 120 is no longer abutting the end 8a of the collar 8, and therefore the tongue portion 110 is no longer pushing the collar 8 forward (i.e., in the direction of arrow 155). With this force removed, only the aforementioned retention forces remain. Therefore, in the unlocking state, the spring clip 100 may be removed from the MPO connector module 2 by a user who uses a finger or a tool, such as a pair of tweezers, to extract the spring clip 100 from the keying slot 135. Once the spring clip 100 has been extracted, the MPO connector module 2 may be decoupled from the receptacle 21 in the normal manner described above with reference to FIG. 1.

It should be noted that the invention has been described with respect to illustrative embodiments for the purpose of describing the principles and concepts of the invention. The invention is not limited to these embodiments. For example, while the spring clip 100 has been described as having a particular shape, spring clips having other shapes may be used to accomplish the objectives described above, as will be understood by persons skilled in the art in view of the present disclosure. Also, which the invention has been described with reference to a particular MPO connector module 2, the invention is not limited with respect to the type of MPO connector module it may be used, as will be understood by persons skilled in the art.

What is claimed is:

1. A locking device for use with a multi-fiber push on (MPO) connector module for preventing the MPO connector module from being decoupled from a receptacle, the locking device comprising:

a clip with a tongue portion having a proximal end and a distal end and a curved portion having a proximal end and a distal end, wherein the proximal end of the tongue portion and the distal end of the curved portion are joined together, and wherein the tongue portion is configured to be inserted into a keying slot of the MPO connector module, the clip configured to be inserted into the keying slot of the MPO connector module in such a way that the clip prevents the MPO connector module from being decoupled from the receptacle.

2. The locking device of claim 1, wherein the clip is a spring clip that is configured to be placed in a locking state and an unlocking state, wherein in the locking state, the spring clip exerts a force on a collar of the MPO connector module that prevents the collar from sliding such that the collar is held in a position that prevents one or more latching elements of the receptacle from disengaging from one or more latching elements of the MPO connector module.

3. The locking device of claim 2, wherein the curved portion of the spring clip is generally U-shaped, and wherein in the locking state, the proximal end of the generally U-shaped portion abuts a forward surface of an outer housing of the MPO module and the distal end of the generally U-shaped portion abuts an end of the collar, and wherein the abutment of the proximal end of the generally U-shaped portion with the forward surface of the outer housing and the abutment of the distal end of the generally U-shaped portion with the end of the collar creates a spring force that biases the collar in a direction toward the receptacle to thereby hold the collar in said position that prevents one or more latching elements of the receptacle from disengaging from one or more latching elements of the MPO connector module.

4. The locking device of claim 3, wherein the spring clip comprises sheet metal.

5. The locking device of claim 3, wherein in the unlocking state, at least the distal end of the spring clip is retained within the keying slot of the MPO connector module until a user removes the spring clip from the MPO connector module.

6. A method for preventing a multi-fiber push on (MPO) connector module from being decoupled from a receptacle, the method comprising:
provarying a clip with a tongue portion having a proximal end and a distal end and a curved portion having a proximal end and a distal end, wherein the proximal end of the tongue portion and the distal end of the curved portion are joined together, and wherein the tongue portion is configured to be inserted into a keying slot of the MPO connector module;
attaching the clip to the keying slot of the MPO connector module in such a way that the clip prevents the MPO connector module from being decoupled from the receptacle.

7. The method of claim 6, wherein the clip is a spring clip that is configured to be placed in a locking state and an unlocking state, wherein in the locking state, the spring clip exerts a force on a collar of the MPO connector module that prevents the collar from sliding such that the collar is held in a position that prevents one or more latching elements of the receptacle from disengaging from one or more latching elements of the MPO connector module.

8. The method of claim 7, wherein the curved portion of the spring clip is generally U-shaped, and wherein the spring clip is placed in the locking state by placing the proximal end of the generally U-shaped portion in abutment with a forward surface of an outer housing of the MPO module, and wherein the abutment of the proximal end of the generally U-shaped portion with the forward surface of the outer housing causes the distal end of the generally U-shaped portion to bias the collar in a direction toward the receptacle to thereby hold the collar in said position that prevents one or more latching elements of the receptacle from disengaging from one or more latching elements of the MPO connector module.

9. The method of claim 8, wherein the spring clip comprises sheet metal.

10. The method of claim 8, wherein in the unlocking state, at least the distal end of the spring clip is retained within the keying slot of the MPO connector module until a user removes the spring clip from the MPO connector module.

\* \* \* \* \*